United States Patent
Thiemann et al.

(10) Patent No.: US 7,523,094 B1
(45) Date of Patent: Apr. 21, 2009

(54) ASYNCHRONOUS TASK FOR ENERGY COST AWARE DATABASE QUERY OPTIMIZATION

(75) Inventors: Ulrich Thiemann, Rochester, MN (US); Wei Hu, Middleton, WI (US); Shantan Kethireddy, Rolling Meadows, IL (US); Andrew Peter Passe, Rochester, MN (US); Robert Joseph Bestgen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 12/049,343

(22) Filed: Mar. 16, 2008

(51) Int. Cl.
*G06F 17/30* (2006.01)

(52) U.S. Cl. .................. 707/2; 707/3; 707/10

(58) Field of Classification Search ......... None
See application file for complete search history.

(56) References Cited

U.S. PATENT DOCUMENTS

| | | | |
|---|---|---|---|
| 5,822,749 | A | 10/1998 | Agarwal |
| 2002/0198867 | A1* | 12/2002 | Lohman et al. ............ 707/3 |
| 2004/0205053 | A1* | 10/2004 | Bird et al. ............ 707/3 |
| 2005/0091196 | A1* | 4/2005 | Day et al. ............ 707/3 |
| 2006/0004696 | A1 | 1/2006 | Day et al. |
| 2006/0167883 | A1 | 7/2006 | Boukobza |
| 2006/0224563 | A1 | 10/2006 | Hanson et al. |
| 2006/0294058 | A1* | 12/2006 | Zabback et al. ............ 707/2 |
| 2007/0136238 | A1 | 6/2007 | Bildhaeuser et al. |

OTHER PUBLICATIONS

"Cost Control: Inside the Oracle Optimizer", by Donald Burleson, Http://WWW.dba-oracle.com/art_otn_cbo_p6.htm, Oracle SQL cpu_costio_cost server tuning , 5 pages, Feb. 10, 2008.

* cited by examiner

*Primary Examiner*—John Cottingham
*Assistant Examiner*—Kimberly Lovel
(74) *Attorney, Agent, or Firm*—MaxValueIP, LLC

(57) ABSTRACT

This is an example of a new method for optimization of database queries which uses an asynchronous task which keeps the most current status of the database objects by directly interfacing the existing storage management system. This asynchronous task in combination with query plan and cache data is able to aid in detecting and choosing "warm" query costing alternatives. The cold/warm status information of the asynchronous task helps query optimizer to determine: if it is suitable to use "warm" costing for a new query optimization; validate previous decisions to use a "warm"-optimized query plan, when it comes to potentially reuse and run with such a plan again; decide whether it's worthwhile to still cache such a plan in the plan cache.

1 Claim, 2 Drawing Sheets

ASYNCHRONOUS TASK FOR ENERGY COST AWARE DATABASE QUERY OPTIMIZATION

BACKGROUND OF THE INVENTION

Traditionally database query optimization does not take into account system hardware energy consumption but rather tries to optimize the query runtime performance by considering data access plan alternatives and comparing their CPU (central processing unit) and I/O (input-output) (runtime) costs. While almost all queries involve accessing data from physical database objects like tables and indexes (on disc storage, for example), there are queries that are truly I/O bound (as compared to CPU bound), i.e. the data access cost comes mainly from those I/O operations and the involved CPU time for other query related computations is minimal.

The I/O situation can change, though, when the query is either run multiple times or the database objects are accessed from different tasks concurrently or within the same shorter timeframe. The effect of those multiple accesses to the same disc storage is that the underlying storage management system usually caches the requested data in memory and thus does not require a physical access for the next request for the same storage area. This often makes the query CPU-bound, since there is very little or no real disc activity anymore in this "warm" (cached) state.

Existing query optimizers usually just optimize the query plan on "cold" (not cached) costing for the involved database objects and, if at all, only react to a change from "cold" to "warm" by considering re-optimizing the query based on runtime statistics from previous query runs. It is beneficial to incorporate energy cost considerations of those different access methods while maintaining acceptable query performance by making energy-cost-aware decisions between alternative access methods.

SUMMARY OF THE INVENTION

This is an example of a new method for optimization of database queries that uses an asynchronous task which keeps the most current status of the database objects by directly interfacing the existing storage management system and periodically requesting the current status. This asynchronous task in combination with query plan and cache data is able to aid in detecting and choosing "warm" query costing alternatives. This will minimize the more energy consuming physical ("cold") access to disc drives of a query execution plan and will favor the far less expensive logical ("warm") accesses.

Via the cold/warm status information of the asynchronous task, query optimizer is able to determine: if it is suitable to use "warm" costing for a new query optimization; validate previous decisions to use a "warm"-optimized query plan, when it comes to potentially reuse and run with such a plan again; or decide whether it's worthwhile to still cache such a plan in the plan cache, for example when some database objects have gone "cold" again.

DETAILED DESCRIPTION OF THE PREFERRED EMBODIMENTS

Figure 1:
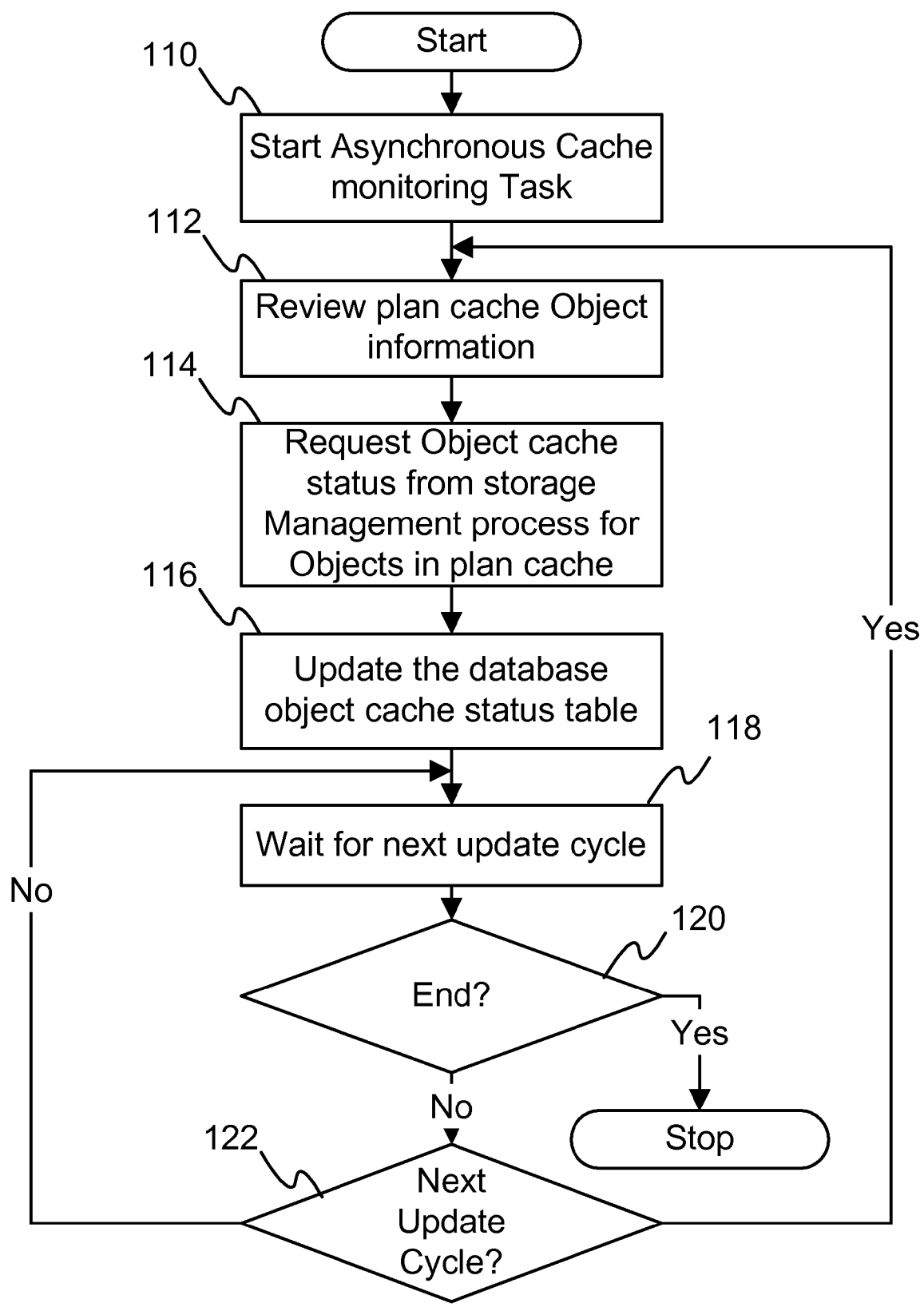
FIG. 1 is the flow diagram for asynchronous task responsible for query cache and database object status request and update.

This is an example of a new method for optimization of database queries that uses an asynchronous task which keeps the most current status of the database objects by directly interfacing with the existing storage management system. A query optimizer then uses this fresh information to optimize the query plans and plan cache.

In one embodiment of this method, an asynchronous task queries, monitors, and records the "warm/cold" status of database objects via existing storage management interfaces. The task will get its input for what database objects to target from the already existing plan cache. The plan cache contains information about currently running and previously run queries system wide and about the database objects referenced by those queries.

This cold/warm information that the asynchronous task gathers and asynchronously keeps current, helps optimizer to easily and quickly decide if it is suitable to use "warm" costing for a new query optimization, validate previous decisions to use a "warm"-optimized query plan, when it comes to potentially reuse and run with such a plan again, or decide whether it's worthwhile to still cache such a plan in the plan cache, for example when some database objects have gone "cold" again.

In another embodiment of this method, the asynchronous task also has information available about concurrent and very recent activities against the database objects referenced in the query. This information is provided and maintained by cross-query-optimization communication with the asynchronous task as a conduit. This method uses this very "fresh" information to predict which database objects will very shortly become "warm", such as from a query optimization that just finished, or a query optimization that is about to finish and is planning to or just started to access those database objects.

Another embodiment of this method is a method of optimizing a first access plan for a first database query, this method comprising: querying a plan cache; wherein this plan cache comprises one or more cached queries; determining one or more cache-query database objects referenced by any of the one or more cached queries; asynchronously querying, monitoring, and recording a first status for a first cache-query database object of the one or more cache-query database objects via a storage management interface.

If the first cache-query database object is cached and accessing the cache query database object consumes a logical access to a cached data, then the first status is warm-status type. If the first cache-query database object is not cached and accessing the first cache-query database object consumes a physical disk drive access, then the first status is cold-status type; cost-based optimizing the first access plan for the first database query; wherein the first database query references one or more query-referenced database objects; determining a second status of a first query-referenced database object of the one or more query-referenced database objects.

In the determining the second status, if the first query-referenced database object is the same as the first cache-query database object, then the second status is the same as the first status. In determining the second status step, predicting the second status based on a prior query optimization associated with an access plan for accessing the first query-referenced database object.

Wherein the prior query optimization is one of a recently completed query optimization or an ongoing query optimization; in the cost-based optimizing step, determining a cost of access to the first query-referenced database object based on the second status. In the cost-based optimizing step, if a second cache query of the one or more cached queries is the same as the first cache query, then validating a second access plan associated with the second cached query, and if the second access plan is validated, then reusing the second access plan for the first access plan.

Wherein the validating the second access plan fails, if a cache status of any database object referenced by the second cached query is changed since the second cached query was executed; and determining whether to remove the second access plan from the plan cache, if validating the second access plan fails.

Figure 2:
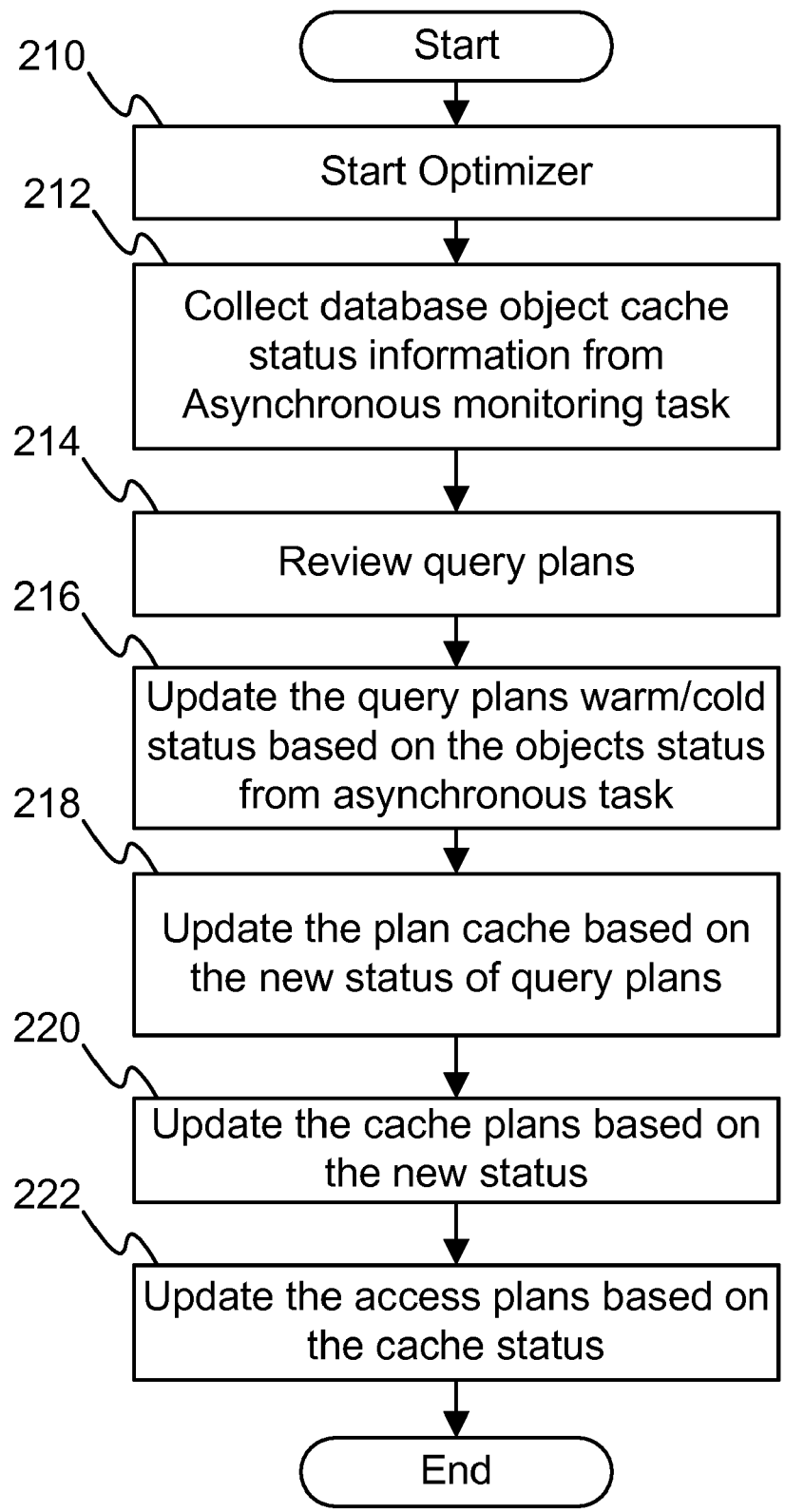
FIG. 2 is the Optimizer flow diagram which uses the updated status from the asynchronous task.

Another embodiment of the system is depicted in FIGS. 1 and 2. The asynchronous task is started (110) and connection is established with storage management process. This asynchronous task then reviews the plan cache's object information for the database (112). This task then requests the object cache status form the storage management for all the objects in the plan cache (114). This asynchronous task then uses the information from storage management and updates its database object cache status table with latest information received (116). This information may indicate that objects cache status has changed from "warm" to "cold" or "cold" to "warm" or no change. At this point the asynchronous task awaits for another update cycle to arrive or end or stop command is received (118). If end or stop command is received (120), the process stops and asynchronous task terminates. If next update cycle arrives (122), the asynchronous process reviews the plan cache information again (112) and steps 114 to 122 repeats.

Referring to FIG. 2, once the query optimizer starts (210), all the database object cache status information is collected from the asynchronous monitoring task (212). Next, query plans are reviewed (214). Optimizer then for each query plan uses the database object information collected from the asynchronous task and updates the "warm" and "cold" status (216). Optimizer then updates the status of the query plans in the plan cache repository (218). At this point optimizer can update the cache plans on the plan cache and drop of or add new plans based on the current status of query plans (220). And finally update the access plans based on this status (222) before terminating.

A system, apparatus, or device comprising one of the following items is an example of the invention: database, entry, information in database, I/O, optimizer, query, buffer, analyzer, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of database optimization and management.

Any variations of the above teaching are also intended to be covered by this patent application.

The invention claimed is:

1. A method of optimizing a first access plan for a first database query, said method comprising:

querying a plan cache;

wherein said plan cache comprises one or more cached queries;

determining one or more cache-query database objects referenced by any of said one or more cached queries;

asynchronously querying, monitoring, and recording a first status for a first cache-query database object of said one or more cache-query database objects via a storage management interface;

wherein if said first cache-query database object is cached and accessing said first cache-query database object consumes a logical access to a cached data, then said first status is warm-status type;

wherein if said first cache-query database object is not cached and accessing said first cache-query database object consumes a physical disk drive access, then said first status is cold-status type;

cost-based optimizing said first access plan for said first database query;

wherein said first database query references one or more query-referenced database objects;

determining a second status of a first query-referenced database object of said one or more query-referenced database objects;

wherein, in said determining said second status, if said first query-referenced database object is the same as said first cache-query database object, then setting said second status to said first status;

wherein in said determining said second status step, if said first status is cold-status, then setting said second status to warm-status if there is a prior query optimization associated with an access plan for accessing said first query-referenced database object;

wherein said prior query optimization is one of a recently completed query optimization or an ongoing query optimization;

in said cost-based optimizing step, determining a cost of access to said first query-referenced database object based on said second status;

in said cost-based optimizing step, if a second cache query of said one or more cached queries is the same as said first database query, then validating a second access plan associated with said second cached query, and if said second access plan is validated, then reusing said second access plan for said first access plan;

wherein said validating said second access plan fails, if a cache status of any database object referenced by said second cached query is changed since said second cached query was executed; and determining whether to remove said second access plan from said plan cache, if said validating said second access plan fails.

\* \* \* \* \*